United States Patent
Aston

(10) Patent No.: US 10,942,792 B2
(45) Date of Patent: Mar. 9, 2021

(54) EVENT DRIVEN SUBSCRIPTION MATCHING

(71) Applicant: PUSH TECHNOLOGY LIMITED, Maidenhead (GB)

(72) Inventor: Philip Allan George Aston, Maidenhead (GB)

(73) Assignee: PUSH TECHNOLOGY LIMITED, Maidenhead (GB)

( * ) Notice: Subject to any disclaimer, the term of this patent is extended or adjusted under 35 U.S.C. 154(b) by 0 days.

(21) Appl. No.: 15/765,486

(22) PCT Filed: Oct. 17, 2016

(86) PCT No.: PCT/US2016/057422
§ 371 (c)(1),
(2) Date: Apr. 2, 2018

(87) PCT Pub. No.: WO2017/066804
PCT Pub. Date: Apr. 20, 2017

(65) Prior Publication Data
US 2018/0307546 A1  Oct. 25, 2018

Related U.S. Application Data

(60) Provisional application No. 62/242,208, filed on Oct. 15, 2015.

(51) Int. Cl.
*G06F 9/54* (2006.01)
*G06F 9/44* (2018.01)
(Continued)

(52) U.S. Cl.
CPC ............... *G06F 9/542* (2013.01); *G06F 9/44* (2013.01); *G06Q 10/107* (2013.01); *H04L 67/26* (2013.01); *H04L 67/42* (2013.01)

(58) Field of Classification Search
CPC ............ G06F 9/542; G06F 9/44; G06F 9/546; G06Q 10/107; H04L 67/42; H04L 67/26; H04L 67/2823; H04L 67/28
See application file for complete search history.

(56) References Cited

U.S. PATENT DOCUMENTS 6,751,463 B1  6/2004  Lorello et al.
8,244,810 B1  8/2012  Haldar
(Continued)

FOREIGN PATENT DOCUMENTS

| WO | WO 2009/032493 A1 | 3/2009 | |
| WO | WO 2014/072746 A1 | 5/2014 | |
| WO | WO-2014072746 A1 * | 5/2014 | ............. H04L 51/16 |

OTHER PUBLICATIONS

PCT International Search Report and Written Opinion, PCT Application No. PCT/GB2013/052972, dated Dec. 13, 2013, 10 pages.
(Continued)

*Primary Examiner* — Javier O Guzman
(74) *Attorney, Agent, or Firm* — Fenwick & West LLP

(57) ABSTRACT

A data distribution system server uses an event-driven matching approach for matching subscription requests with topics on the data distribution system server. Threads from multiple client session are received and assigned to a multiplexer for processing. Each multiplexer determines a topic value and status information for multiple subscriptions to a topic corresponding to the topic value. The multiplexer identifies subscriptions added to one of the client sessions, receives a topic update for the topic, and broadcasts the topic update to the added subscriptions.

21 Claims, 6 Drawing Sheets

(51) Int. Cl.
  *G06Q 10/10* (2012.01)
  *H04L 29/08* (2006.01)
  *H04L 29/06* (2006.01)

(56) References Cited

U.S. PATENT DOCUMENTS

| | | | | |
|---|---|---|---|---|
| 8,990,375 B2* | 3/2015 | Li | ............... | H04L 67/22 |
| | | | | 709/223 |
| 9,667,681 B1* | 5/2017 | Milyakov | ............. | H04L 47/286 |
| 10,425,341 B2* | 9/2019 | Murthy | ............... | H04L 47/30 |
| 2003/0188198 A1* | 10/2003 | Holdsworth | ........ | G06F 21/6218 |
| | | | | 726/1 |
| 2009/0204712 A1* | 8/2009 | Lankford | ............ | H04L 67/1002 |
| | | | | 709/227 |
| 2010/0221010 A1* | 9/2010 | Sasaki | ............... | H04J 14/005 |
| | | | | 398/75 |
| 2010/0281169 A1* | 11/2010 | Charles | ............... | H04L 69/16 |
| | | | | 709/227 |
| 2011/0138400 A1 | 6/2011 | Chandler et al. | | |
| 2011/0219107 A1 | 9/2011 | Betros et al. | | |
| 2011/0289429 A1* | 11/2011 | Berry | ............... | G06Q 10/10 |
| | | | | 715/752 |
| 2012/0233268 A1* | 9/2012 | Bedi | ............... | H04L 51/14 |
| | | | | 709/206 |
| 2013/0111054 A1* | 5/2013 | Harrington | ........... | H04L 65/605 |
| | | | | 709/231 |
| 2013/0144971 A1* | 6/2013 | Austin-Lane | ........... | H04L 67/02 |
| | | | | 709/217 |
| 2013/0231190 A1* | 9/2013 | Rajaraman | .......... | H04L 67/2823 |
| | | | | 463/42 |
| 2014/0067940 A1* | 3/2014 | Li | ............... | H04L 69/16 |
| | | | | 709/204 |
| 2014/0324959 A1 | 10/2014 | Hudson | | |
| 2015/0207857 A1* | 7/2015 | Horton | ............... | H04L 67/16 |
| | | | | 709/204 |
| 2016/0072930 A1* | 3/2016 | Shi | ............... | H04W 28/065 |
| | | | | 370/392 |
| 2016/0226991 A1* | 8/2016 | Li | ............... | H04L 51/32 |
| 2017/0041266 A1* | 2/2017 | Walkin | ............... | H04L 51/14 |
| 2019/0116235 A1* | 4/2019 | Walkin | ............... | H04L 51/04 |

OTHER PUBLICATIONS

PCT International Search Report and Written Opinion, PCT/US2016/057422, dated Jan. 9, 2017, 12 Pages.

* cited by examiner

EVENT DRIVEN SUBSCRIPTION MATCHING

1. FIELD OF ART

This disclosure generally relates to the field of data distribution on computer networks, and more specifically, to broadcasting topic updates to subscribers having subscriptions matching the updated topics.

2. BACKGROUND

The increased demand for data means that business systems and applications must exchange data efficiently and intelligently at scale with devices, browsers, and other applications over the Internet. To meet this increased demand for data, some data distribution platforms employ a publish-subscribe model in which senders of messages, called control clients, publish messages into classes (e.g., topics) without knowledge of subscribers who may receive the messages. Subscribers in a topic-based publish-subscribe system will receive all messages published to the topics to which they subscribe, and all subscribers to a topic will receive the same messages. Control clients establish a session with the server to create and maintain topics and clients establish a session with the server to consume data published by the control clients. In the event that the session(s) updating a given topic disconnect, this can result in situations where client sessions are consuming "stale" data.

The figures depict embodiments for purposes of illustration only. One skilled in the art will readily recognize from the following description that alternative embodiments of the structures and methods illustrated herein may be employed without departing from the principles of the invention described herein.

Data Distribution System Architecture

Figure 1:
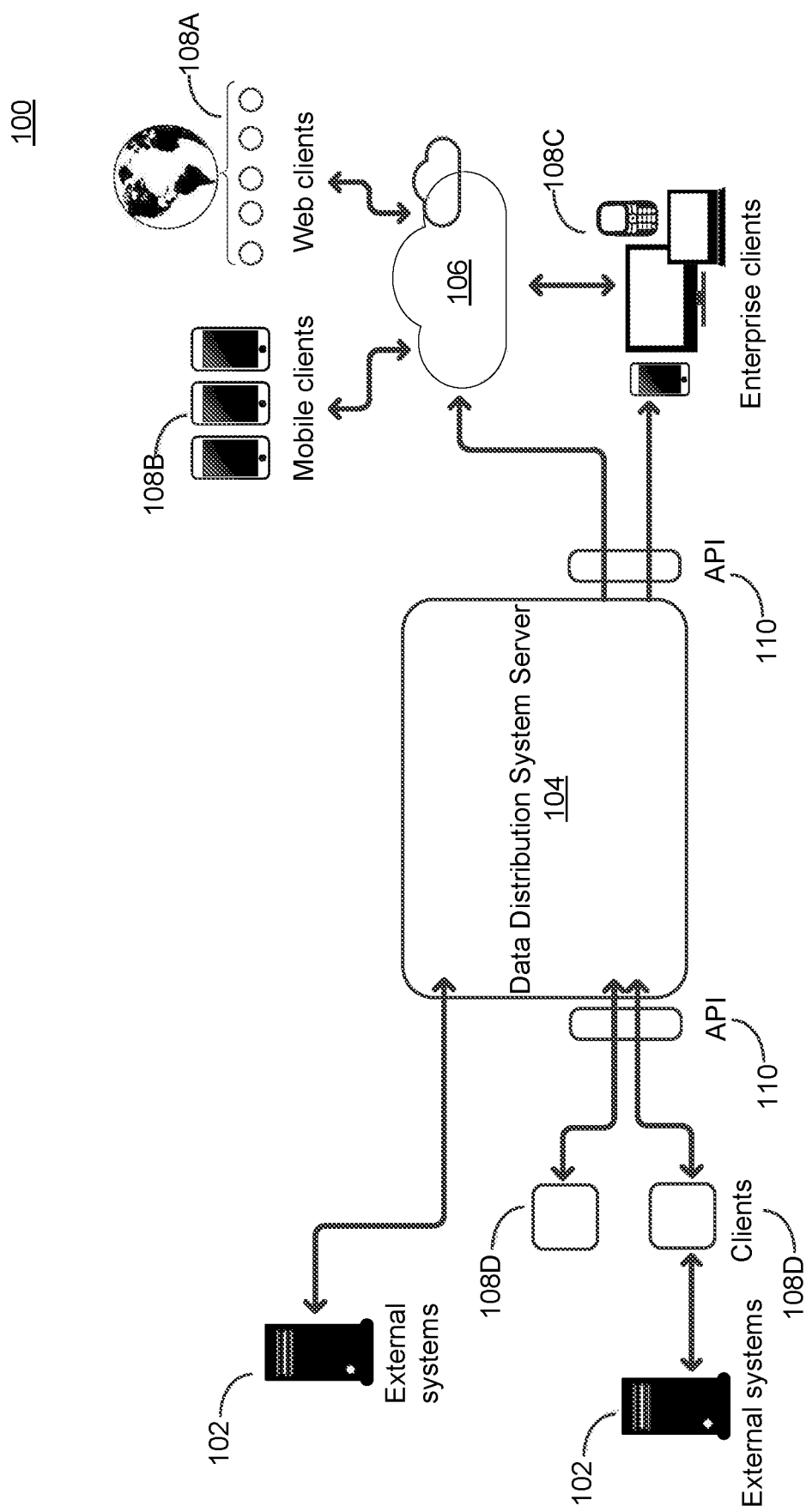
FIG. 1 is a block diagram of a data distribution system, according to one embodiment.

FIG. 1 is a block diagram of a data distribution system 100, according to one embodiment. One or more external systems 102 interact with the data distribution system server 104 to distribute data to multiple client applications over a network 106. An external system 102 may be a server associated with a data source for distribution via the data distribution system 100. Example data sources include entities such as a stock exchange, an online game provider, a media outlet, or other source that distributes topical data to users over the network 106, such as the Internet.

The external system 102 communicates with the data distribution system server 104 via a hosted application called "publisher," which enables the external system to create and maintain topics on the data distribution system server 104 for distribution to multiple clients. Alternatively, topics may be maintained by a separate client process external to the data distribution system server 104. Such clients 108 are referred to as control clients.

A client 108 is an application that communicates with the data distribution system server 104 using one or more specified client protocols. Example client protocols include WebSocket (WS) and Hypertext Transfer Protocol (HTTP). Some clients 108 connect to the data distribution system server 104 to subscribe to topics and receive message data on those topics. Other clients 108, which have different permissions, perform control actions such as creating and updating topics or handling events.

In the embodiment shown in FIG. 1, the data distribution system 100 includes different categories of clients 108, including web 108A, mobile 108B, and enterprise 108C clients. The category of client depends on the language of the API 110 used by a client 108 to interact with the data distribution system server 104 and libraries used to implement the API 110. Web clients 108A include browser applications that use JavaScript, ActionScript®, or Silverlight® APIs. Mobile clients 108B may be mobile applications that interact with the data distribution system server 104 using iOS or Android APIs. Enterprise clients 108C may be any application connecting to the data distribution system server 104 over a data distribution system server protocol for Transmission Control Protocol (TCP) over the Internet or an intranet/extranet using Java, .Net, or C APIs.

The API 110 may include the libraries appropriate to the platform executing the client application. Clients 108 may be implemented in one of a number of languages and use variety of protocols to communicate with the server. Clients 108 may perform different types of actions depending on their permissions and the capabilities of the API 110 they use.

Clients 108 used by data consumers typically subscribe to topics and receive the updates that are published to these topics from the data distribution system server 104. Clients 108D used by data providers typically create, manage, and update topics. These clients 108D also take responsibility for control functions, for example authenticating and managing other client sessions.

The data distribution system server 104 hosts publisher applications and a topic tree, manages connections from clients 108, and matches topic updates with subscriptions. To match topic updates with subscriptions, the data distribution system server 104 divides the processing of subscription operations across multiple threads, each thread processed by a dedicated multiplexer that processes subscription operations for a specified group of client sessions. Each multiplexer is assigned to a processor to enable the data distribution system server 104 to more efficiently handle processing of a large number of session, each with multiple topic selectors.

Figure 2:
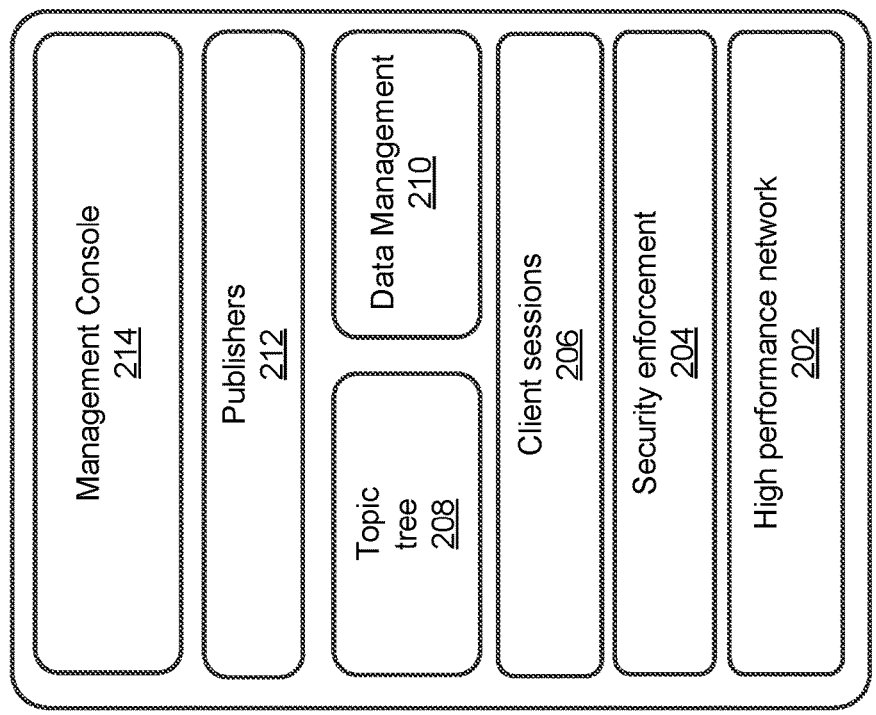
FIG. 2 is a block diagram illustrating components of a data distribution system server, from FIG. 1, according to one embodiment.

FIG. 2 is a block diagram illustrating components of the data distribution system server 104, from FIG. 1, according to one embodiment. The data distribution system server 104 may be a standalone server or part of a cluster of servers to provide a scalable enterprise data distribution solution. The data distribution system server 104 pushes (streams) and receives data and events, in real-time, both to and from client applications. The data distribution system server 104 includes a high performance network layer 202, security enforcement module 204, client session module 206, topic tree 208, data management module 210, publishers 212, and a management console 214.

The high performance network layer 202 handles a high number of concurrent connections without the need for separate threads. Connectors handle connections from many different types of clients and for various protocols. Connectors may be configured to listen on different ports. Multiple clients may connect to a single port.

The security enforcement module 204 authenticates connections from clients and manages authorization and setting permissions for actions that those clients can take when they are connected to the data distribution system sever 104.

The client sessions module 206 manages the sessions for the clients that connect to the data distribution system server 104. The client session module 206 stores information about the client and the client's subscriptions. If a client disconnects, it can reconnect to the same session within a specified time period using the information stored in the client session module 206. The client session module 206 also handles matching topic updates with subscriptions. As further described with reference to FIGS. 4 and 5, the client session module 206 includes a client manger for receiving inbound threads of subscription, session, and topic operation messages from multiple client sessions, and multiple multiplexers for matching topic updates with subscriptions for specified groups of client sessions. The client session module 206 stores information about resolved subscriptions, the topic selections for each session, and the current value of each topic. Using the stored information, the client session module 206 matches topic updates to subscriptions to those topics.

The data management module 210 performs operations on the data to more efficiently deliver it to clients. Example operations include structural conflation, merging, and replacing data to ensure that the latest data is received by the client.

The management console 214 may operate as an optional publisher that is deployed by default. The management console 214 may be used to monitor the operations of the data distribution system server 104 through a web browser and to stop and start publishers 212 within the data distribution system server 104.

Publishers 212 are components hosted within the data distribution system server 104 that manage the data for one or more topics and publish messages to any clients that subscribe to the topics that the publisher manages. In one example, publishers 212 are written using the Java API and extend the issued publisher class and implement various methods to provide the publisher functionality. A publisher 212 maintains its own data model. The publisher 212 initializes its data as it starts and updates it as a result of external events. When a client first subscribes to a topic, the publisher 212 provides the client with a snapshot of the current state of the data relating to that topic. This is referred to as a "topic load." A client 108 can also request the current state of a topic, even if not subscribed to it, using the "fetch" command.

A publisher 212 maintains any changes to its topic data state and publishes those changes to the topic as delta messages. This results in the message being sent to every client 108 that is subscribed to the topic. Publishers 212 can send messages to individual clients 108 or to groups of clients 108 and can receive messages from clients 108. Under certain operating conditions, the publisher 212 does not need to know or keep track of the clients 108 subscribed to its topics. Publishers 212 own the topics they create. Ownership of a topic is used to determine which publisher 212 receives a message from a client 108, deals with subscription, and/or creates dynamic topics. Publishers 212 hosted in the data distribution system server 104 may act as client applications to other data distribution system servers 104. A publisher 212 may do this by subscribing to topics on the other servers to create a distributed architecture.

Figure 3:
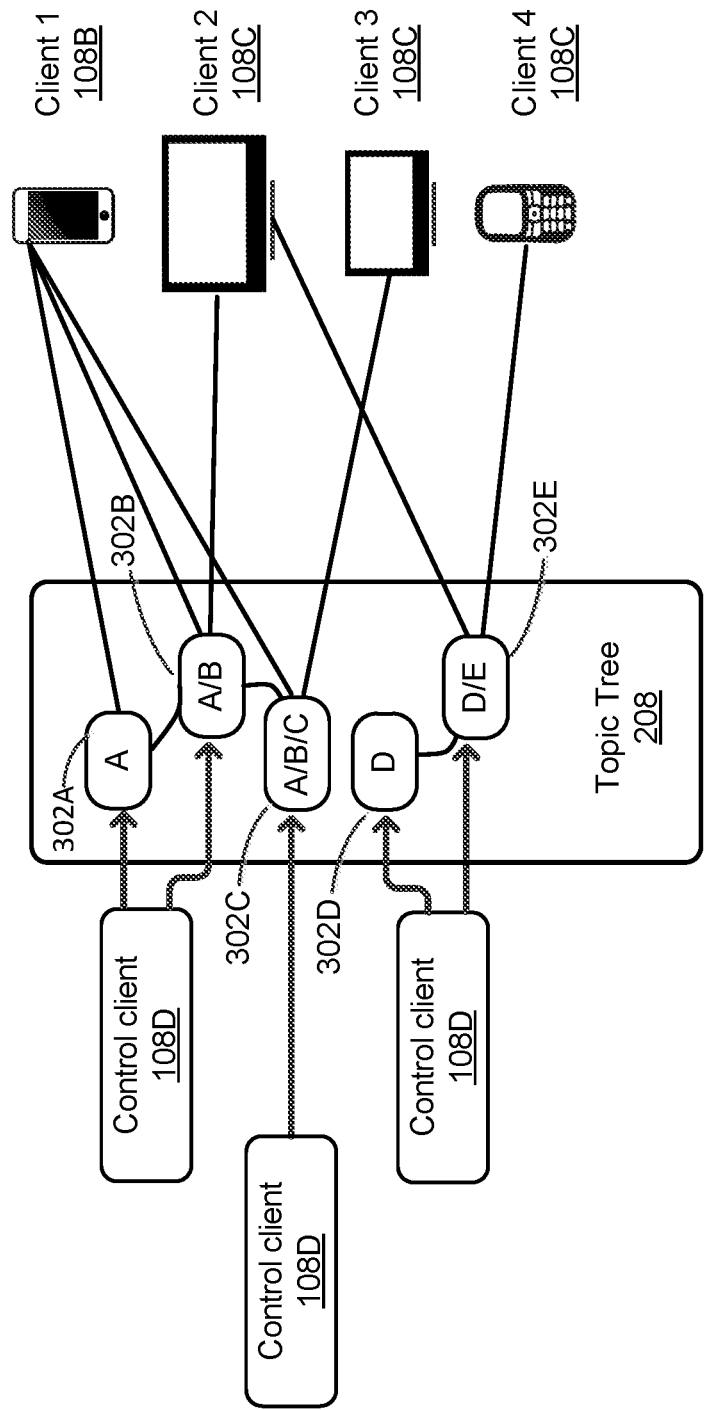
FIG. 3 is a diagram illustrating the logical connections between a control client and clients based on topics, according to one embodiment.

The topic tree 208 represents a data model of the organizational structure of the topics available to be published to clients 108. The topic tree 208 is arranged hierarchically and comprised of top-level topics with subordinate topics. These subordinate topics can themselves have subordinate topics. A topic of any type can be bound to any node of the topic tree 208. Each node within the topic tree 208 may have a topic associated with it and each topic may maintain a stateful data value indicating the current state of the data relating to a particular topic. Each node may correspond to a different topic. Several topics may point to the same data. A single topic may point to a different topic for each client 108. Alternatively, a topic may be a vehicle for streaming values without retaining a stateful data FIG. 3 is a diagram illustrating a topic tree 208 comprised of logical connections between control clients 108D and clients 108 based on topics 302, according to one embodiment. The data model represented by the topic tree 208 shows the relationships between clients 108, control clients 108D, and the topics 302 maintained by the data distribution system server 204. Clients 108 and control clients 108D are loosely coupled through logical links representing the topics 302. A control client 108D publishes messages to a topic 302 and a client 108 subscribes to a topic 302 and receives its messages. A topic path may also be used by a client 108 to send messages to the control client 108D that receives messages on that topic path. The client 108 is aware of the topic path, but unaware of the control client 108D. Topics 302 are created in the data distribution system server 104 by control clients 108D. Each topic 302 has a unique name within the data distribution system server 104. As shown in FIG. 3, the topic names are A, B, C, D, and E.

In one example, topics 302 may be arranged in a tree structure. Tree structure includes nodes corresponding to topics joined together by a topic path. In the embodiment shown in FIG. 3, Topic B 302B is beneath topic A 302A in the topic tree 208 and topic E 302E is beneath topic D 302D in the topic tree 208. The location of the topic 302 in the topic tree 208 is described by the topic path. The topic path includes all the topics above it in the topic tree 208 in an order separated by the slash character (/). For example, the path to topic B 302B is A/B and the path to topic E 302E is D/E. The topic tree 208 may include any number of topics 302. A copy of the topic tree 208 is maintained by the client sessions module 206 to match updates topics included in the topic tree 208 with resolved subscriptions.

Event Driven Subscription Matching Overview

Figure 4:
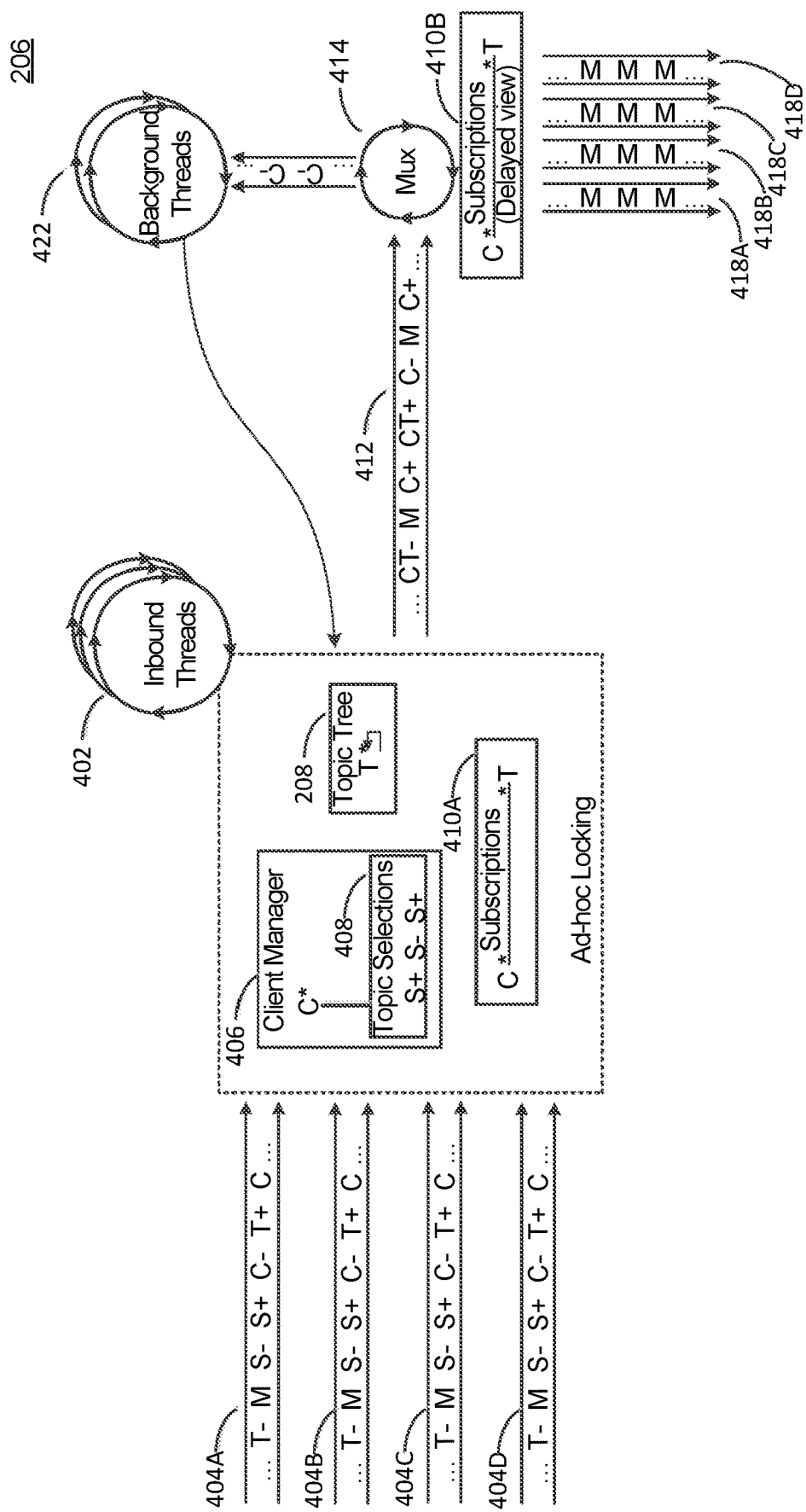
FIG. 4 is a diagram illustrating a thread-based message processing technique for matching subscription requests with topics on the data distribution system server, according to one embodiment.

FIG. 4 is a diagram illustrating a thread-based message processing for matching subscription requests with topics on the data distribution system server 104, according to one embodiment. As previously described with reference to FIG. 2, the data distribution system server 104 includes a client session module 206 that maintains a set of subscriptions to topics for each client session. When a topic receives new data, the data distribution system server 104 sends an update message to each subscribed client session.

The data distribution system 100 uses the concept of a "stateful topic" with an associated data value. Stateful topics combine aspects of publish/subscribe messaging with the state management of in-memory data. When a subscription to a stateful topic is resolved, the data distribution system server 104 sends the topic's current value to the client session subscribed to that topic.

In the embodiment shown in FIG. 4, the client session module 206 performs subscription matching for an inbound thread of subscription requests from multiple clients 108. An inbound thread 402 includes message streams from multiple clients 108. A message stream 404 includes multiple messages, also referred to as events, having different message types for subscribing to topics and receiving updates that are published to these topics. Example message types include topic operation messages, session operation messages, and subscription operation messages.

Topic operations include topic added, topic removed, and topic load and topic update, represented by symbols "T+", "T−", and "M". The topic load message provides the complete data value for the topic to the session. The topic load also provides the basis for topic data types that support updates using a stream of "delta messages" that contain a more compact representation of the change to the topic's value. A delta message may include information about changes to topic information. Session operations include session opened and session closed, represented by symbols "C+" and "C−", respectively.

Subscription operations include resolved subscription, unsubscription, subscribe to topic selection and unsubscribe from topic selection, represented by messages "CT+", "CT−", "S+" and "S−", respectively. For example, a subscription is resolved (i.e., added to a client session that owns a topic selection) when a "subscription" operation, corresponding to message "CT+" adds a new topic selection using a "S+" message that matches an existing topic, or when a topic is added using a "T+" message that matches an existing topic selector. Subscriptions are removed from a session using an "unsubscription" message "CT−" when the session is closed; when a topic selector is removed using "S−"; or when a topic is removed using "T−". The input thread 402 that receives a subscription operation from a client 108 applies the new topic selector to the current.

In the embodiment shown in FIG. 4, the client session module 206 includes a client manager 406 for processing an input thread. The client manager 206 receives an input thread that includes messages from clients 108, and applies the new topic selector to the current topics. In one embodiment, the thread may include multiple message streams 404 that include messages from various clients 108. For each thread, the client manager 406 maintains state information about the resolved subscriptions 410, the topic selections 408 for each session, and the current value of each topic from the topic tree 208 corresponding to the topic selections 408. The state information includes subscription and session operations messages and topic load messages. The client session module 206 manages a set of "topic selectors" 408 that is matched against the set of topics specified in the message streams. For each topic that matches, the client manager 406 sends a topic load message to the client session and notifies the appropriate multiplexer 414 of the new subscription.

In the embodiment shown in FIG. 4, when a topic is removed, the client manager 406 calculates the removed resolved subscriptions and notifies the multiplexer 414 through CT− events. Similarly, when a topic is added, the client manager 206 calculates the new resolved subscriptions and notifies the multiplexer 414 through CT+ events.

The multiplexer 414 receives subscription events, topic load events, and session events and identifies client sessions, topic selections for those identified clients, and a subscription for those topics. The multiplexer 414 broadcasts topic updates to the identified sessions 418 that are subscribed to the topic. For example, FIG. 4 shows four identified sessions 418A-418D. The multiplexer 414 coordinates sending of topic load events and subsequent topic update events. The multiplexer 414 sends to a newly subscribed client a topic's current value, in the correct order with respect to subsequent update events, to avoid missing update events. This coordination may be implemented using topic-level locking on a thread-by-thread basis.

The multiplexer 414 can independently detect a problem with a client session. Detected problems may include a closed client session or writing messages to a client session that fails process the messages within a specified period of time. In the event of a detected problem, the multiplexer 414 may request that the client manager 406 close the client session. To avoid blocking the multiplexer 414 from processing session, subscription, and topic events, the multiplexer 414 asynchronously dispatches a C− event through a background thread 422 for processing the request to close the detected client session. The background threads 422 interact with the client manager 406 to complete the closure of the detected client session.

Figure 5:
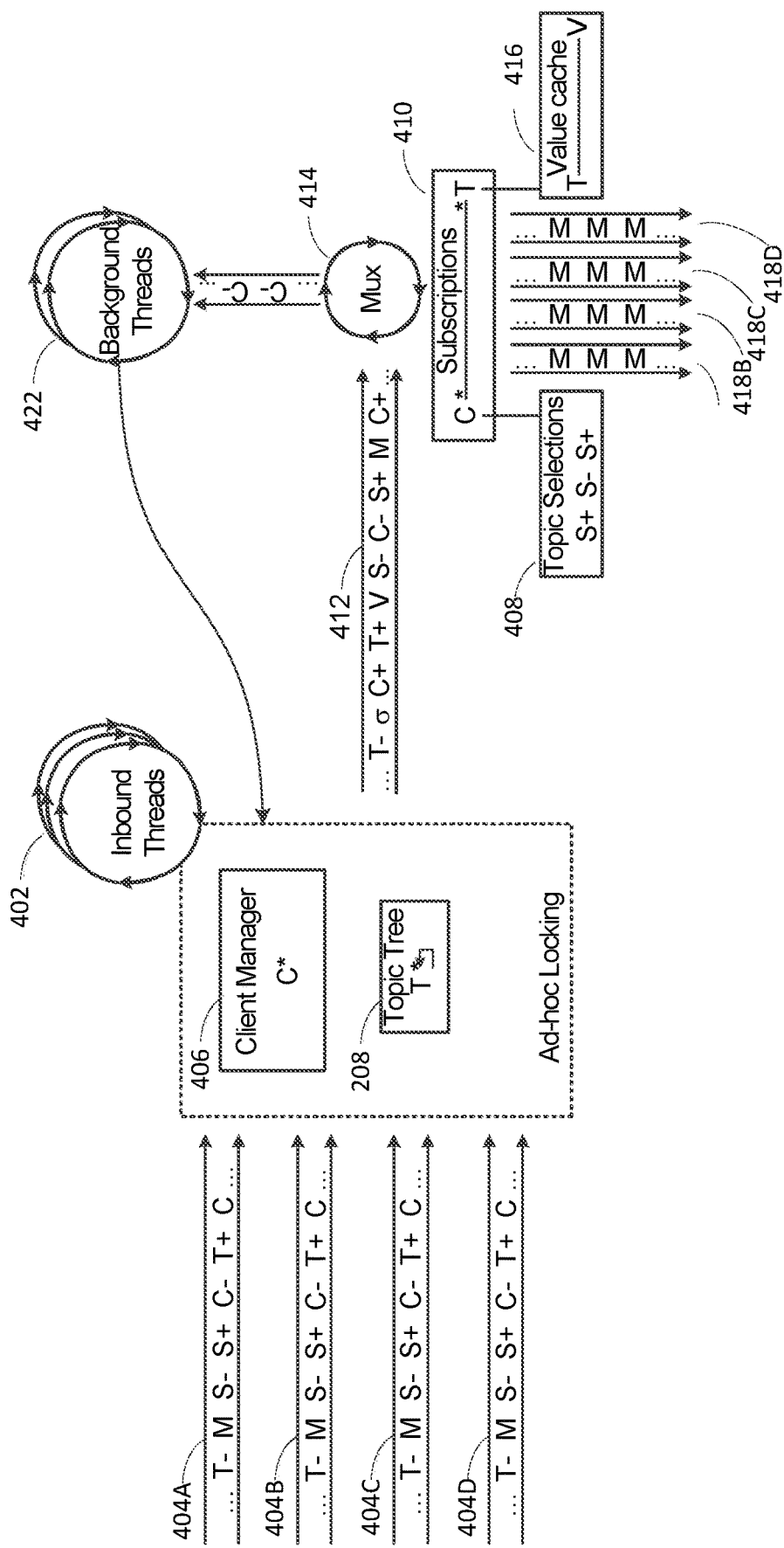
FIG. 5 is a diagram illustrating a multiplexer-based message processing technique for matching subscription requests with topics on the data distribution system server, according to one embodiment.

FIG. 5 is a diagram illustrating a multiplexer-based message processing technique for matching subscription requests with topics on the data distribution system server 104, according to one embodiment. In the embodiment shown in FIG. 5, the data distribution system server 104 uses an event-driven matching approach to move responsibility for subscription matching from the client manager 406 to the multiplexers 414 and sharding it across the client sessions.

Like the embodiment in FIG. 4, the client manager 406 maintains the current value of each topic from the topic tree 208 and the value of the session status for each thread 402. However, in contrast to the embodiment in FIG. 4, in the embodiment shown in FIG. 5 the client manager 406 does not maintain state information about the resolved subscriptions 410 or the topic selections 408 for each session. Instead to support event-driven matching, the client manager 406 maintains information about which multiplexer 414 is assigned to a particular client session and the status of those sessions. Using the client session information, the client manager 406 routes subscription operation events to a specified multiplexer 414 for processing topic updates in accordance with the multiplexer assignment information.

Each multiplexer 414 stores state information about resolved subscriptions 410, topic selections 408, and topic value cache 416. The topic value cache 416 stores topic values passed to the multiplexer 414 as structured data 412. Other values passed to the multiplexer 414 by the client manager 406 include delta values using a "a" message representing a change in a topic value. Messages passed to the multiplexer 414 include "topic added," "topic removed," "session opened," "session closed," and "topic load and topic update."

Each multiplexer 414 is an active object that runs in its own thread. A session is assigned to a specific multiplexer 414, which handles a discrete partition of the sessions. Each multiplexer 414 operates independently and has its own uncontended data structures. The data structures include the resolved subscriptions for the assigned sessions. Each multiplexer 414 is notified of a topic update, and is responsible for the sending of messages to the assigned sessions 418 that are subscribed to the topic. This allows broadcast of updates to scale linearly across available CPU cores. Moreover, each multiplexer 414 processes events in batches, which reduces coordination between threads, and makes efficient use of the memory cache hierarchy. Subscription matching can be scaled across the available processor resources by assigning each multiplexer 414 to a processor core. This, in turn, enables the subscription processing following the addition of a topic to be divided across the multiplexers 414 to improve processing efficiency.

Figure 6:
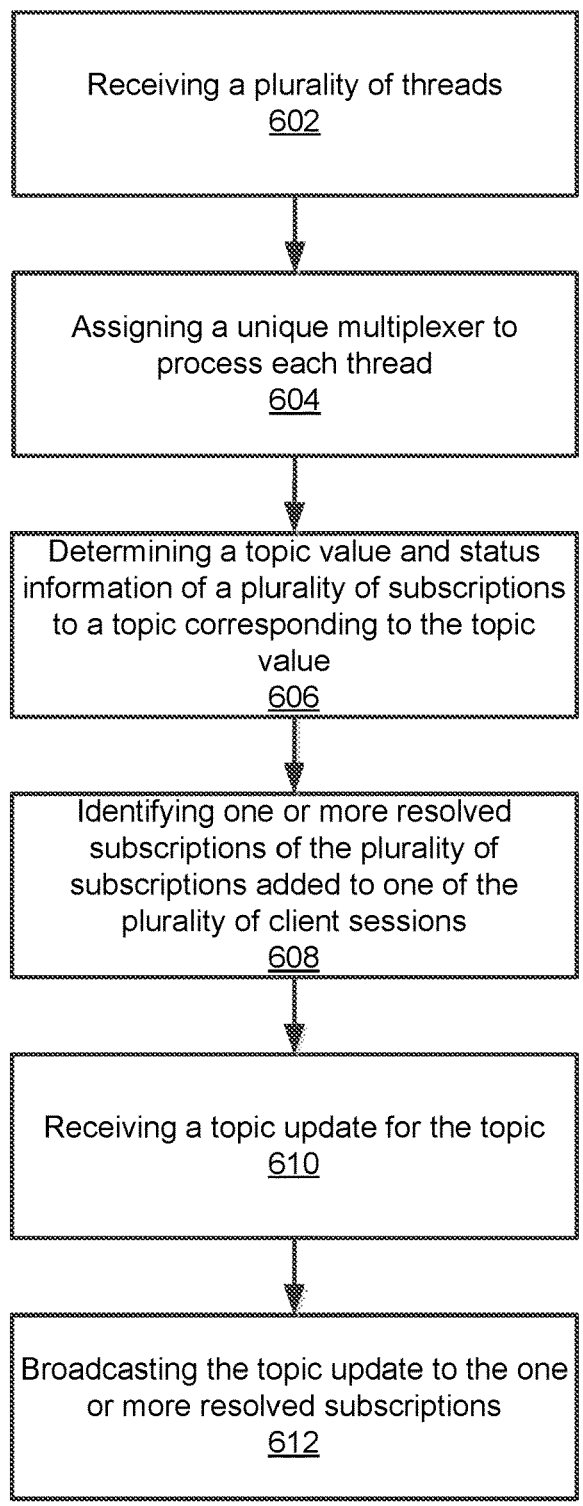
FIG. 6 is a flowchart illustrating a method of broadcasting topic updates to clients having subscriptions to updated topics, according to one embodiment.

FIG. 6 is a flowchart illustrating a method of broadcasting topic updates to clients 108 having subscriptions to updated topics, according to one embodiment. In one embodiment, the data distribution system server 104 receives 602 a plurality of threads. Each thread may include multiple message streams including one or messages from multiple client sessions. The data distribution system server 104 assigns 606 a unique multiplexer 414 to process each thread.

Each multiplexer 414 then processes topics for each assigned thread. For example, a multiplexer 414 determines 606 a topic value and status information related to multiple subscriptions to a topic corresponding to topic value. The status specifies whether the subscription is assigned a client session. The topic value and subscriptions are determined by the multiplexer 414 from the messages included in the messages streams that belong to the assigned thread. The multiplexer 414 then identifies 608 one or more resolved subscriptions of the multiple subscriptions added to one of the multiple client sessions. When the multiplexer 414 receives 610 a topic update for the topic, it broadcasts 612 the topic update to each client session associated with a resolved subscription.

SUMMARY

The foregoing description has been presented for the purpose of illustration; it is not intended to be exhaustive or to limit the description to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based herein. Accordingly, the disclosure of the embodiments is intended to be illustrative, but not limiting, of the scope of the invention, which is set forth in the following claims.

What is claimed is:

1. A method comprising:
receiving one or more threads, each thread comprising a plurality of received messages from a subset including two or more client sessions of a plurality of client sessions, and the plurality of received messages in each thread describing topic values and subscription information for the subset of client sessions in the thread;
assigning a unique multiplexer of a plurality of multiplexors to process each thread, each multiplexer processing the plurality of received messages from the subset of client sessions in the thread to which it is assigned;
routing received messages to their assigned multiplexor of the plurality of multiplexors according to previously resolved topic subscriptions of client sessions in the thread assigned to each multiplexor; and
for each multiplexer of the plurality of multiplexors, processing received messages in its assigned thread independently from other multiplexors in the plurality of multiplexors by:
determining, from the received messages included in the thread, a topic value and subscription information for a plurality of subscriptions to a topic corresponding to the topic value,
identifying, at the multiplexor, using the subscription information determined from the received messages, one or more new subscriptions matching the topic from the plurality of subscriptions, the one or more new subscriptions added to one or more client sessions in the subset of client sessions,
receiving a topic update for the topic, and
broadcasting the topic update to the one or more client sessions adding the new subscriptions matching the topic.

2. The method of claim 1, wherein the subscription information for the plurality of subscriptions specifies which client sessions of the subset of client sessions are subscribed to the topic.

3. The method of claim 1, further comprising assigning each multiplexor to a unique processor of a plurality of processors, wherein each multiplexor processes its assigned thread using its assigned processor.

4. The method of claim 1, wherein each multiplexor stores information about subscriptions for the subset of client sessions in its assigned thread that match the topic.

5. The method of claim 1, wherein each multiplexor stores information about the topic for the subset of client sessions, assigned to the multiplexer.

6. The method of claim 1, wherein each multiplexer stores information about topic values corresponding to the one or more new subscriptions added to the one or more client sessions assigned to the multiplexer.

7. The method of claim 1, wherein the topic values represent a current state of data related to the corresponding topic.

8. The method of claim 1, wherein the topic values represent a change in a current state of data related to the corresponding topic.

9. A computer program product comprising a non-transitory computer-readable storage medium having encoded thereon:
    instructions that when executed by a processor, cause the processor to:
        receive one or more threads, each thread comprising a plurality of received messages from a subset including two or more client sessions of a plurality of client sessions, and the plurality of received messages in each thread describing topic values and subscription information for the subset of client sessions in the thread;
        assign a unique multiplexor of a plurality of multiplexors to process each thread, each multiplexor processing the plurality of received messages from the subset of client sessions in the thread to which it is assigned;
        route received messages to their assigned multiplexor of the plurality of multiplexors according to previously resolved topic subscriptions for the subset of client sessions in the thread assigned to each multiplexor; and
        for each multiplexer of the plurality of multiplexors, process received messages in its assigned thread independently from other multiplexors in the plurality of multiplexors by executing instructions that farther causing the processor to:
            determine, from the received messages included in the thread, a topic value and subscription information for a plurality of subscriptions to a topic corresponding to the topic value,
            identify, at the multiplexor, using the subscription information determined from the received messages, one or more new subscriptions matching the topic from the plurality of subscriptions, the one or more new subscriptions added to one or more client sessions in the subset of client sessions, receive a topic update for the topic, and
            broadcast the topic update to the one or more client sessions adding the new subscriptions matching the topic.

10. The computer program product of claim 9, wherein the subscription information for the plurality of subscriptions specifies which client sessions of the subset of client sessions are subscribed to the topic.

11. The computer program product of claim 9 wherein the instructions, when executed, further cause the processor to assign each multiplexor to a unique processor of a plurality of processors, wherein each multiplexor processes its assigned thread using its assigned processor.

12. The computer program product of claim 9, wherein each multiplexer stores information about subscriptions for the subset of client sessions in its assigned thread that match the topic.

13. The computer program product of claim 9, wherein each multiplexer stores information about the topic for the subset of client sessions assigned to the multiplexer.

14. The computer program product of claim 9, wherein each multiplexer stores information about topic values corresponding to the one or more new subscriptions added to the one or more client sessions assigned to the multiplexer.

15. The computer program product of claim 9, wherein the topic values represent a current state of data, related to the corresponding topic.

16. The computer program product of claim 9, wherein the topic values represent a change in a current state of data related to the corresponding topic.

17. A system comprising:
    a computer processor for executing computer program instructions; and
    a non-transitory computer-readable medium storing computer program instructions executable by the computer processor to perform operations comprising:
        receiving one or more threads, each thread comprising a plurality of received messages from a subset including two or more client sessions of a plurality of client sessions, and the plurality of received messages in each thread describing topic values and subscription information for the subset of client sessions in the thread,
        assigning a unique multiplexor of a plurality of multiplexors to process each thread, each multiplexor processing the plurality of received messages from the subset of client sessions in the thread to which it is assigned,
        routing received messages to their assigned multiplexor of the plurality of multiplexors according to previously resolved topic subscriptions for the subset of client sessions in the thread assigned to each multiplexor; and
        for each multiplexer of the plurality of multiplexors, processing received messages in its assigned thread independently from other multiplexors in the plurality of multiplexors by:
            determining, from the received messages included in the thread, a topic value and subscription information for a plurality of subscriptions to a topic corresponding to the topic value,
            identifying, at the multiplexor, using the subscription information determined from the received messages, one or more new subscriptions matching the topic from the plurality of subscriptions, the one or more new subscriptions added to one or more client sessions in the subset of client sessions,
            receiving a topic update for the topic, and
            broadcasting the topic update to the one or more client sessions adding the new subscriptions matching the topic.

18. The system of claim 17, wherein the subscription information for the plurality of subscriptions specifies which client sessions of the subset of client sessions are subscribed to the topic.

19. The system of claim 17, further comprising, assigning each multiplexor to a processor of a plurality of processors, wherein each multiplexor processes its assigned thread using its assigned processor.

20. The system of claim 17, wherein each multiplexer stores information about subscriptions for the subset of client sessions in its assigned thread that match the topic.

21. The method of claim 1, further comprising:
   responsive to adding the one or more new subscriptions matching the topic to one or more client session in the subset of client sessions, routing received messages corresponding to the one or more new subscriptions to the multiplexor assigned to process the subset of client sessions newly subscribing to the topic.

* * * * *